(12) United States Patent
Wang et al.

(10) Patent No.: US 7,902,390 B2
(45) Date of Patent: Mar. 8, 2011

(54) CATALYST ACTIVATORS, PROCESSES FOR MAKING SAME, AND USE THEREOF IN CATALYSTS AND POLYMERIZATION OF OLEFINS

(75) Inventors: Zhike Wang, Baton Rouge, LA (US); Lubin Luo, Baton Rouge, LA (US); Steven P. Diefenbach, Baton Rouge, LA (US)

(73) Assignee: Albemarle Corporation, Baton Rouge, LA (US)

( * ) Notice: Subject to any disclaimer, the term of this patent is extended or adjusted under 35 U.S.C. 154(b) by 151 days.

(21) Appl. No.: 12/374,420

(22) PCT Filed: Jul. 2, 2007

(86) PCT No.: PCT/US2007/072647
§ 371 (c)(1),
(2), (4) Date: Jan. 20, 2009

(87) PCT Pub. No.: WO2008/011269
PCT Pub. Date: Jan. 24, 2008

(65) Prior Publication Data
US 2009/0270571 A1  Oct. 29, 2009

Related U.S. Application Data

(60) Provisional application No. 60/831,341, filed on Jul. 17, 2006.

(51) Int. Cl.
*B01J 31/14* (2006.01)
*C07F 5/06* (2006.01)
*C08F 4/6592* (2006.01)
*B01J 31/22* (2006.01)

(52) U.S. Cl. ......... 556/179; 502/154; 502/155; 502/156; 502/167; 502/231; 526/143; 526/160; 526/165

(58) Field of Classification Search .................. 502/154, 502/155, 156, 167, 231; 526/160, 165, 143; 556/179
See application file for complete search history.

(56) References Cited

FOREIGN PATENT DOCUMENTS
JP          6-329714 A2    11/1994
JP       2001/323009 A2    11/2001
WO       WO 01/90112 A1    11/2001

*Primary Examiner* — Caixia Lu
(74) *Attorney, Agent, or Firm* — James A. Jubinsky

(57) ABSTRACT

A composition useful for activating catalysts for olefin polymerization Is provided. The composition is derived from at least: carrier; treated organoaluminoxy compound: and ionic compound having at feast one active proton.

21 Claims, No Drawings

CATALYST ACTIVATORS, PROCESSES FOR MAKING SAME, AND USE THEREOF IN CATALYSTS AND POLYMERIZATION OF OLEFINS

BACKGROUND

Partially hydrolyzed aluminum alkyl compounds known as aluminoxanes (AO) are used for activating transition metals for olefin polymerization activity. One such compound, methylaluminoxane (MAO), is a frequently chosen aluminum co-catalyst/activator in the industry. Considerable effort has been devoted to improving the effectiveness of catalyst systems based on use of aluminoxanes of modified aluminoxanes for polymerization of olefins. Representative patents and publications in the field of aluminoxane usage include the following: U.S. Pat. No. 5,324,800 to Welborn et al.; U.S. Pat. No. 4,752,597 to Turner; U.S. Pat. Nos. 4,980,878 and 5,041,584 to Crapo et al.; WO 96102580 to Dall'occo, et al.; EP 0 277 003 and EP 0 277 004 to Turner: Hlatky, Turner, and Eckman, *J. Am. Chem. Soc.*, 1989, 111, 2728-2729; Hlatky and Upton, *Macromolecules*, 1986, 29, 8019-8020. U.S. Pat. No. 5,153,157 to Hlatky and Turner; U.S. Pat. No. 5,198,401 to Turner, Hlatky, and Eckman; Brintzinger, et al., *Angew. Chem. Int. Ed. Engl.*, 1995, 34, 1143-1170; and the like. Despite technological advances, many aluminoxane-based polymerization catalyst activators still lack the activity and/or thermal stability needed for commercial applicability, require commercially unacceptably high aluminum loading, are expensive (especially MAO), and have other impediments to commercial implementation.

Many of the limiting features surrounding the use of aluminoxanes as activators for transition metals, for example, activity limitations—and the need for high aluminum loading, can be addressed by the use of stable or metastable hydroxyaluminoxanes. As compared to aluminoxanes, hydroxyaluminoxanes are generally highly active, provide reduced levels of ash, and result in improved clarity in polymers formed from such catalyst compositions. One representative hydroxyaluminoxane is hydroxyisobutylaluminoxane (HO-IBAO), which can be derived from the low-temperature hydrolysis of triisobutylaluminum (TIBA). Hydroxyaluminoxane compositions are disclosed in U.S. Pat. Nos. 6,562,991, 6,555,494, 6,492,292, 6,462,212, and 6,160,145.

In contrast to aluminoxanes, which appear to act as Lewis acids to activate transition metals, hydroxyaluminoxane species (generally abbreviated HO-AO) comprise active protons, and appear to activate transition metals by functioning as Brønsted acids. As used herein, an active proton is a proton capable of metal alkyl protonation. A typical hydroxyaluminoxane comprises a hydroxyl group bonded to at least one of its aluminum atoms. To form hydroxyaluminoxanes, typically a sufficient amount of water is reacted with an alkyl aluminum compound under appropriate conditions, for example at low temperature in hydrocarbon solvents, such that a compound having at least one HO—Al group is generated, which is capable of protonating a hydrocarbyl ligand from a d- or f-block organometallic compound to form a hydrocarbon. Therefore, polymerization catalysts derived from a hydroxyaluminoxane usually comprise: 1) a cation derived from a transition, lanthanide or actinide metal compound, for example a metallocene, by loss of a leaving group, and 2) an aluminoxate anion derived by transfer of a proton from a stable or metastable hydroxyaluminoxane to the leaving group. The leaving group is usually transformed into a neutral hydrocarbon thus rendering the catalyst-forming reaction irreversible.

One feature of hydroxyaluminoxanes is that their active protons are often thermally unstable when maintained in solution at ambient temperatures, likely due to the loss of active protons through alkane elimination. Thus, hydroxyaluminoxanes are frequently stored at temperatures lower than ambient temperature to maintain the active proton concentration. Typical low temperature storage is from about $-20°$ C. to about $0°$ C. In the absence of such low temperature handling, the hydroxyaluminoxane activity decreases rapidly. Low-temperature storage is commercially cost prohibitive, especially over extended periods of time.

Thus, a need exists for hydroxyaluminoxane-type compositions that have more thermally-robust active protons, as compared to currently available hydroxyaluminoxanes, and that exhibit suitably high activity for commercial olefin polymerization.

THE INVENTION

This invention provides activator compositions derived from at least: a) carrier, b) treated organoaluminoxy compound, and c) ionic compound having at least one active proton, which compositions meet the above-described need. This invention also provides activator compositions derived from at least; a) carrier; b) treated organoaluminoxy compound; and c) N,N-dimethylaniline and pentafluorophenol in amounts such that there are at least two equivalents of pentafluorophenol per equivalent of the N,N-dimethylaniline. This invention also provides methods of preparing compositions comprising combining at least: a) carrier: b) treated organoaluminoxy compound; and c) N,N-dimethylaniline and pentafluorophenol in amounts such that there are at least two equivalents of pentafluorophenol per equivalent of the N,N-dimethylaniline. Use of the term "at least" indicates that other components may possibly be included when combining the carrier treated organoaluminoxy compound, and N,N-dimethylaniline and pentafluorophenol in amounts such that there are at least two equivalents of pentafluorophenol per equivalent of the N,N-dimethylaniline, or deriving a compound therefrom. For example, a compound of this invention could be derived from, or made from a method comprising combining, (i) carrier, treated organoaluminoxy compound, and N,N-dimethylaniline and pentafluorophenol in amounts such that there are at least two equivalents of pentafluorophenol per equivalent of this N,N-dimethylaniline, and (ii) additional N,N-dimethylaniline. This invention also provides activator compositions derived from at least: a) carrier; b) treated organoaluminoxy compound; c) N,N-dimethylaniline and d) at least two (2) equivalents (e.g., moles) of pentafluorophenol per equivalent (e.g., mole) of the N,N-dimethylaniline. The pentafluorophenol and N,N-dimethylaniline in the prescribed 2 to 1 equivalent relationship form a particularly conductive Bronsted acidic ionic compound that enhances the activity of activator compositions according to this invention. This invention also provides compositions derived from at least: a) carrier; b) treated organoaluminoxy compound; and c) ionic compound having at least one active proton, which is derived from N,N-dimethylaniline and pentafluorophenol.

Activator Compositions

Activator compositions according to this invention comprise carrier, treated organoaluminoxy compound, and ionic compound having at least one active proton. Also provided are activator compositions derived from carrier, treated organoaluminoxy compound, and ionic compound having at least one active proton combined in any order.

The combining of carrier, treated organoaluminoxy compound, and ionic compound having at least one active proton can be conducted in an inert gas atmosphere; at a temperature from about −80° C. to about 200° C., or from about 0° C. to about 120° C.; the combining time can be from about 1 minute to about 36 hours, or from about 10 minutes to about 24 hours. Solvent used for preparing activator composition can comprise aliphatic solvent or aromatic solvent, either of which is inert to carrier, treated organoaluminoxy compound, and ionic compound having at least one active proton. Example treatments after completion of the combining operation include filtration of supernatant, followed by washing with inert solvent and evaporation of solvent under reduced pressure or in inert gas flow, but these treatments are not required. Resulting activator composition can be used for polymerization in any suitable state, including fluid, dry, or semi-dry powder, and may be used for polymerization in the state of being suspended in inert solvent. The combining of carrier with treated organoaluminoxy compound can be conducted at ambient temperature and at a combining time of from about 15 minutes to about 48 hours, or from about 15 minutes to about 6 hours; the resulting combination can be used as is or subsequently heated to a temperature of about 80° C. to about 120° C. Alternatively, the combining of carrier with treated organoaluminoxy compound can be conducted at a temperature of from about 80° C. to about 120° C. at a combining time of from about 15 minutes to about 6 hours. At least a portion of resulting product is combined with ionic compound having at least one active proton.

The amount of aluminum atom in treated alkylaluminoxane in the product, e.g., solid component, obtained by combining carrier with treated alkylaluminoxane can be not less than about 0.1 mmol aluminum atom, or not less than about 1 mmol aluminum atom, in 1 g of the solid component in the dry state. When solid component obtained by combining carrier with treated alkylaluminoxane is combined with ionic compound having at least one active proton, the molar ratio of active proton to aluminum atom of alkylaluminoxane in the solid component can be from about 0.02 to about 1, or from about 0.05 to about 0.5, or from about 0.1 to about 0.3.

Activator Compositions—Carriers/Supports

Carriers useful in activator compositions according to this invention comprise inorganic carriers or organic carriers. A plurality of carriers can be used as a mixture, and carriers of this invention may comprise water, e.g., as absorbed water or in hydrate form. A carrier of this invention may be porous and have a micro pore volume of not less than 0.1 ml/g of silica, or not less than 0.3 ml/g. A carrier of this invention may have a micro pore volume of about 1.6 ml/g of silica. The average particle diameter of the carrier may be from about 5 micrometers to about 1000 micrometers, or from about 10 micrometers to about 500 micrometers.

One silica useful in this invention is porous and has a surface area in the range of from about 10 m$^2$/g silica to about 700 m$^2$/g silica, a total pore volume in the range of from about 0.1 cc/g silica to about 4.0 cc/g silica, and an average particle diameter in the range of from about 10 micrometers to about 500 micrometers. A silica useful in this invention can have a surface area in the range of from about 50 m$^2$/g to about 500 m$^2$/g, a pore volume in the range of from about 0.5 cc/g to about 3.5 cc/g, and an average particle diameter in the range of from about 15 micrometers to about 150 micrometers. A useful silica may have a surface area in the range of from about 200 m$^2$/g to about 350 m$^2$/g, a pore volume in the range of from about 1.0 cc/g to about 2.0 cc/g, and an average particle diameter in the range of from about 10 micrometers to about 110 micrometers.

An average pore diameter of a typical porous silicon dioxide carrier useful in this invention is in the range of from about 10 angstroms to about 1000 angstroms, or from about 50 angstroms to about 500 angstroms, or from about 175 angstroms to about 350 angstroms. A typical content of hydroxyl groups is from about 0.04 mmol OH/g silica to about 3.0 mmol OH/g silica, with or without the presence of free hydroxyl groups, as determined by the following Grignard reaction. Most of these active OH groups react readily with benzylmagnesium chloride Grignard to produce toluene, and this reaction can be used to quantify the concentration of active OH groups on a particular silica. A typical content of hydroxyl groups is from about 0.10 mmol OH/g silica to about 2.0 mmol OH/g silica, or from about 0.4 mmol OH/g silica to about 1.5 mmol OH/g silica.

Example inorganic carriers that may be useful in this invention include inorganic oxides, magnesium compounds, clay minerals and the like. The inorganic oxides can comprise silica, alumina, silica-alumina, magnesia, titania, zirconia, and clays. Example inorganic oxides useful in this invention include, without limitation, $SiO_2$, $Al_2O_3$, MgO, $ZrO_2$, $TiO_2$, $B_2O_3$, CaO, ZnO, BaO, $ThO_2$ and double oxides thereof, e.g. $SiO_2$—$Al_2O_3$, $SiO_2$—MgO, $SiO_2$-i$O_2$, $SiO_2$—$TiO_2$—MgO. Example magnesium compounds useful in this invention include $MgCl_2$, MgCl(OEt) and the like. Example clay minerals useful in this invention include kaolin, bentonite, kibushi clay, geyloam clay, allophane, hisingerite, pyrophylite, talc, micas, montmorillonites, vermiculite, chlorites, palygorskite, kaolinite, nacrite, dickite, halloysite and the like.

Example organic carriers that may be useful in this invention include acrylic polymer, styrene polymer, ethylene polymer, propylene polymer and the like. Example acrylic polymers that may be useful in this invention include polymers of acrylic monomers such as acrylonitrile, methyl acrylate, methyl methacrylate, methacrylonitrile and the like, and copolymers of the monomers and crosslinking polymerizable compounds having at least two unsaturated bonds. Example styrene polymers that may be useful in this invention include polymers of styrene monomers such as styrene, vinyltoluene, ethylvinylbenzene and the like, and copolymers of the monomers and crosslinking polymerizable compounds having at least two unsaturated bonds. Example crosslinking polymerizable compound having at least two unsaturated bonds include divinylbenzene, trivinylbenzene, divinyltoluene, divinylketone, diallyl phthalate, diallyl maleate, N,N'-methylenebisacrylamide, ethylene glycol dimethacrylate, polyethylene glycol dimethacrylate and the like.

Organic carrier useful in this invention has at least one polar functional group. Examples of suitable polar functional groups include primary amino group, secondary amino group, imino group, amide group, imide group, hydrazide group, amidino group, hydroxy group, hydroperoxy-group, carboxyl group, formyl group, methyloxycarbonyl group, carbamoyl group, sulfo group, sulfino group, sulfeno group, thiol group, thiocarboxyl group, thioformyl group, pyrrolyl group, imidazolyl group, piperidyl group, indazolyl group and carbazolyl group. When the organic carrier originally has at least one polar functional group, the organic carrier can be used as it is. One or more kinds of polar functional groups can also be introduced by subjecting the organic carrier as a matrix to a suitable chemical treatment. The chemical treatment may be any method capable of introducing one or more polar functional groups into the organic carrier. For example, it may be a reaction between acrylic polymer and polyalkylenepolyamine such as ethylenediamine, propanediamine, diethylenetriamine, tetraethylenepentamine, dipropylenetriamine or the like. As the specific method of such a reaction, for example, there is a method of treating an acrylic polymer (e.g. polyacrylonitrile) in a slurry state in a mixed solution of ethylenediamine and water at 100° C. or more, for example from 120° C. to 150° C. The amount of polar functional group per unit gram in the organic carrier having a polar functional group may be from 0.01 to 50 mmol/g, or from 0.1 to 20 mmol/g.

Activator Compositions—Treated Organoaluminoxy Compounds

Treated organoaluminoxy compound is derived from organoaluminoxy compound and component having at least one electron withdrawing group and at least one active proton. Combining organoaluminoxy compound with component having at least one electron withdrawing group and at least one active proton produces treated organoaluminoxy compound.

Organoaluminoxy Compound

Organoaluminoxy compounds useful in activator compositions of this invention can comprise one or more organoaluminoxy compounds, including aluminoxanes and modified aluminoxanes. Non-limiting examples include cyclic aluminoxane, for example, $\{-Al(R^1)-O-\}_a$ and/or linear aluminoxane, for example, $R^1(-Al(R^1)-O-)_b\ AlR^1{}_2$ (wherein, $R^1$ represents hydrogen or hydrocarbon group having 1 to about 20 carbon atoms, each $R^1$ may be the same or different; and each of "a" and "b" represents an integer of not less than 1).

Specific examples of $R^1$ include alkyl groups having from 1 to about 20 carbon atoms such as methyl, ethyl, n-propyl, isopropyl, n-butyl, isobutyl, n-pentyl, neopentyl and the like. Each of "a" and "b" represent an integer of 1 to 40, or an integer of 3 to 20.

Organoaluminoxy compounds of this invention can be prepared by any suitable method, including currently known methods. For example, alkylaluminoxane can be prepared by dissolving at least one trialkylaluminum (e.g. trimethylaluminum, etc.) in organic solvent (e.g. toluene, aliphatic hydrocarbon, etc.). The organic solvent may comprise aqueous organic solvent. Suitable ratios of trialkylaluminum to organic solvent include: 0.01:1 to 10:1 (mol:mol). According to another method, alkylaluminoxane can be prepared by combining at least one trialkylaluminum (e.g. trimethylaluminum, etc.) with metal salt hydrate (e.g. copper sulfate hydrate, etc.). Suitable ratios of trialkylaluminum to metal salt hydrate include: 0.01:1 to 10:1 (mol:mol). Alkylaluminoxane may comprise trialkylaluminum and/or other materials, which are produced during preparation or otherwise.

Component Having at Least One Electron Withdrawing Group and at Least One Active Proton Component having at least one electron withdrawing group and at least one active proton comprises any component having at least one electron withdrawing group, for example, without limitation, aromatic component or aliphatic component having at least one electron withdrawing group, and at least one active proton.

Component having at least one electron withdrawing group and at least one active proton can comprise conjugate base of the at least one active proton, wherein the conjugate base comprises monodentate donor chemically bonded to at least one electron withdrawing group. For example, component $R^4{}_nXH$, wherein $R^4$ comprises hydrocarbon group having from 1 to 20 carbon atoms, X is O, S, N, or P, n is 1 when X is O or S, and n is 2 when X is H or P, is a suitable component having at least one electron withdrawing group and at least one active proton, $R^4{}_nX$ being the conjugate base of the active proton $H^+$, $R^4$ being a group bearing at least one electron withdrawing group, and X being the monodentate donor. In one example, the conjugate base functions as a monodentate donor (e.g., $RO^-$) and not as a multidentate donor (e.g., $RCCO^-$); for example, $R^4{}_nXH$, where $R^4$ is $C_6F_5$ and X is O, is suitable for use in this invention.

An electron withdrawing group comprises a substituent having a Hammett substituent constant σ that is positive, and examples thereof include fluoro group, chloro group, bromo group, iodo group, cyano group, nitro group, carbonyl group, sulfo group, phenyl group and the like.

Monodentate conjugate base of active proton comprises group capable of forming a chemical bond to organoaluminum compound; and examples thereof include phenoxyl group, alkoxyl group, primary amino group, secondary amino group, imino group, amide group, imide group, thiolic group and the like.

Component having at least one electron withdrawing group and at least one active proton may have various and/or a plurality of electron withdrawing groups or active protons.

Specific examples of component having at least one electron withdrawing group and at least one active proton include, without limitation, phenol, pentafluorophenol, 2,3,5,6-tetrafluorophenol, 2,4,6-trifluorophenol, 2,3-difluorophenol, 2,4-difluorophenol, 2,5-difluorophenol, 2,6-difluorophenol, 3,4-difluorophenol, 3,5-difluorophenol, 2-fluorophenol, 3-fluorophenol, 4-fluorophenol, 2-trifluoromethylphenol, 3-trifluoromethylphenol, 4-trifluoromethylphenol, pentafluorobenzyl alcohol, pentafluorothiophenol, 2,2,2-trifluoromethyl alcohol, 1H, 1H-pentafluoro-propanol, 1,1,1,3,3,3-hexafluoro-2-propyl alcohol, pentachlorophenol, pentabromophenol, 2-chloro-4-fluorophenol, 2-bromo-4-fluorophenol, 2-bromo-4,5-difluorophenol, tetrafluorocatechol, tetrafluorohydroquinone and the like. The foregoing examples include component having at least one electron withdrawing group and at least one active proton with the monodentate donor of its conjugate base chemically bonded to at least one electron withdrawing group. In certain embodiments, halogenated phenols, e.g., fluorinated phenols, are useful. In one embodiment, pentafluorophenol is useful.

Activator Compositions—Ionic Compound Having at Least One Active Proton

Ionic compound having at least one active proton can be derived from at least Lewis base and component having at least one electron withdrawing group and at least one active proton, in one example, ionic compound having at least one active proton is derived from at least N,N-dimethylaniline and at least 2 moles of pentafluorophenol per mole of the N,N-dimethylaniline.

Lewis Base

Lewis base can comprise primary amine $NH_2R^2$, secondary amine $NHR^2{}_2$, or tertiary amine $NR^2{}_3$, or any mixture thereof, wherein $R^2$ in each occurrence is selected independently from hydrocarbyl group having up to about 20 carbon atoms. Each $R^2$ can be the same as, or different from, any other $R^2$. For example, Lewis base can comprise a variety of amines, including, but not limited to, $NMe_2Ph$, $NMe_2(CH_2Ph)$, $NEt_2Ph$, $NEt_2(CH_2Ph)$, or Lewis base can comprise one or more long chain amines such as $NMe(C_nH_{2n+1})(C_mH_{2m+1})$, $NMe_2(C_nH_{2n+1})$, $NEt(C_nH_{2n+1})(C_mH_{2m+1})$, or $NEt_2(C_nH_{2n+1})$, wherein n and m are selected independently from an integer from about 3 to about 20. Examples of long chain amines of the formula $NMe(C_nH_{2n+1})(C_mH_{2m+1})$ include, but are not limited to, compounds such as $NMe(C_{16}H_{33})_2$, $NMe(C_{17}H_{35})_2$, $NMe(C_{18}H_{37})_2$, $NMe(C_{16}H_{33})(C_{17}H_{35})$, $NMe(C_{16}H_{33})(C_{18}H_{37})$, $NMe(C_{17}H_{35})(C_{18}H_{37})$, and the like. For example, $NMe(C_{16}H_{33})_2$ is typically the major species in a commercial long chain amine composition that usually comprises a mixture of several amines. Lewis base may comprise $NMe_2Ph$, $NMe_2(CH_2Ph)$, $NEt_2Ph$, $NEt_2$ (CH$_2$Ph), NMe(C$_{16}$H$_{33}$)$_2$. Lewis, base can also comprise phosphines. Lewis base can comprise N,N-dimethylaniline.

Catalysts for Olefin Polymerization

Activator compositions of this invention are useful in catalysis for olefin polymerization. Activator composition according to this invention and transition metal component may each be added independently, yet substantially simultaneously, to monomer to catalyze polymerization. Activator composition and transition metal component may be combined to form product and at least a portion of product may be added to monomer to catalyze polymerization. The active proton ratio of activator composition to transition metal atom of transition metal component may be 0.1 to 4, or 0.5 to 2, or almost 1.

Activator composition is suitable for activating transition metal component by Brønsted acidity, i.e., by protonating alkylated transition metal component. Activator composition is also suitable for activating transition metal component by Lewis acidity, i.e., by accepting at least one electron pair from transition metal component. The amount of activator composition combined with transition metal component may be sufficient to allow activation of transition metal component predominantly by Brønsted acidify; e.g., 30% or more, 70% or more, or 90% or more of activation may occur due to Brønsted acidify. The amount of activator composition combined with transition metal component may be sufficient to allow activation of transition metal component substantially by Brønsted acidity, e.g., 95% or more, or 98% or more of activation may occur due to Brønsted acidity. Activator composition may be combined with transition metal component either before combining with monomer or while simultaneously combining with monomer. Given a known activator composition and a known transition metal component, one skilled in the art can determine the amount of the activator composition to combine with transition metal component to allow activation predominantly or substantially by Brønsted acidity.

Catalysts for Olefin Polymerization—Transition Metal Component

Transition metal component can comprise any alkylated transition metal component having olefin polymerization potential. For example, without limitation, transition metal component can comprise one or more metallocene transition metal components.

Transition metal component can comprise alkylated catalyst precursor ML$_a$ R$_{n-a}$ (wherein M represents transition metal atom of the 4th Group or Lanthanide Series of the Periodic Table of Elements (1993, IUPAC), and examples thereof include transition metals of the 4th Group of the Periodic Table, such as titanium atom, zirconium atom and hafnium atom and transition metals of the Lanthanide Series, such as samarium; L represents group having cyclopentadienyl skeleton or group having at least one hetero atom, at least one L being group having cyclopentadienyl skeleton, and a plurality of L may be the same or different and may be crosslinked to each other; R represents hydrocarbon group having 1 to about 20 carbon atoms; "a" represents a numeral satisfying the expression 0<a≦n; and n represents valence of transition metal atom M).

In L in transition metal component, group having cyclopentadienyl skeleton can comprise, for example, cyclopentadienyl group, substituted cyclopentadienyl group or polycyclic group having cyclopentadienyl skeleton. Example substituted cyclopentadienyl groups include hydrocarbon group having 1 to about 20 carbon atoms, halogenated hydrocarbon group having 1 to about 20 carbon atoms, silyl group having 1 to about 20 carbon atoms and the like. Silyl group according to this invention can include SiMe$_3$ and the like. Examples of polycyclic group having cyclopentadienyl skeleton include indenyl group, fluorenyl group and the like. Examples of hetero atom of the group having at least one hetero atom include nitrogen atom, oxygen atom, phosphorous atom, sulfur atom and the like.

Example substituted cyclopentadienyl groups include methylcyclopentadienyl group, ethylcyclopentadienyl group, n-propylcyclopentadienyl group, n-butylcyclopentadienyl group, isopropylcyclopentadienyl group, isobutylcyclopentadienyl group, sec-butylcyclopentadienyl group, tertbutylcyclopentadienyl group, 1,2-dimethylcyclopentadienyl group, 1,3-dimethylcyclopentadienyl group, 1,2,3-trimethylcyclopentadienyl group, 1,2,4-trimethylcyclopentadienyl group, tetramethylcyclopentadienyl group, pentamethylcyclopentadienyl group and the like.

Example polycyclic groups having cyclopentadienyl group include indenyl group, 4,5,6,7-tetrahydroindenyl group, fluorenyl group and the like.

Example groups having at least one hetero atom include methylamino group, tert-butylamino group, benzylamino group, methoxy group, tert-butoxy group, phenoxy group, pyrrolyl group, thiomethoxy group and the like.

One or more groups having cyclopentadienyl skeleton, or one or more group having cyclopentadienyl skeleton and one or more group having at least one hetero atom, may be crosslinked with (i) alkylene group such as ethylene, propylene and the like; (ii) substituted alkylene group such as isopropylidene, diphenylmethylene and the like; or (iii) silylene group or substituted silylene group such as dimethylsilylene group, diphenylsilylene group, methylsilylsilylene group and the like.

R in transition metal component comprises hydrogen or hydrocarbon group having 1 to about 20 carbon atoms. Examples of R include alkyl group having 1 to about 20 carbon atoms such as methyl group, ethyl group, n-propyl group, isopropyl group, n-butyl group, benzyl group and the like.

Examples of transition metal component ML$_a$ R$_{n-a}$, wherein M comprises zirconium, include bis(cyclopentadienyl)zirconiumdimethyl, bis(methylcyclopentadienyl)zirconiumdimethyl, bis(pentamethylcyclopentadienyl)zirconiumdimethyl, bis(indenyl)zirconiumdimethyl, bis(4,5,6,7-tetrahydroindenyl)zirconiumdimethyl, bis(fluorenyl)zirconiumdimethyl, ethylenebis(indenyl)zirconiumdimethyl, dimethylsilylene(cyclopentadienylfluorenyl)zirconiumdimethyl, diphenylsilylene(indenyl)zirconiumdimethyl, cyclopentadienyldimethylaminozirconiumdimethyl, cyclopentadienylphenoxyzirconium dimethyl, dimethyl(tert-butylamino)(tetramethylcyclopentadienyl) silanezirconiumdimethyl, isopropylidene(cyclopentadienyl)3-tert-butyl-5-methyl-2-phenoxy)zirconiumdimethyl, dimethylsilylene(tetramethylcyclopentadienyl)(3-tert-butyl-5-methyl-2-phenoxy) zirconiumdimethyl and the like.

Additional exemplary transition metal component ML$_a$ R$_{n-a}$ include components wherein zirconium is replaced with titanium or hafnium in the above zirconium components.

Other alkylated catalyst precursors which may be useful in this invention are: rac-dimethylsilylbis(2-methyl-4-phenylindenyl)zirconium dimethyl (M1); rac-dimethylsilylbis(2-methyl-1-indenyl) zirconium dimethyl (M2); rac-dimethylsilylbis(2-methyl-4,5-benzoindenyl) zirconium dimethyl (M3); ethylenebis(tetrahydroindenyl)-zirconium dimethyl (M4), and ethylenebis(indenyl) zirconium dimethyl (M5). Alkylated catalyst precursor can be generated in-situ through reaction of alkylation agent with the halogenated version of the catalyst precursor. For example, bis(cyclopentadienyl) zirconium dichloride can be treated with triisobutylaluminum (TIBA) and than combined with activator composition.

Polymerization Using Activator Compositions of the Invention

When using activator compositions of the present invention in polymerization, any olefin or dioelfin having 2 to 20 carbon atoms can be used as a monomer for polymerization. Specific examples thereof include ethylene, propylene, butene-1, pentene-1, hexene-1, heptene-1, octene-1, nonene-1, decene-1, hexadecene-1, eicocene-1,4-methylpentene-1,5-methyl-2-pentene-1, vinylcyclohexane, styrene, dicyclopentadiene, norbornene, 5-ethylidene-2-norbornene and the like, but are not limited thereto, in the present invention, copolymerization can be conducted using two or more monomers, simultaneously. Specific examples of the monomers constituting the copolymer include ethylene/an α olefin such as ethylene/propylene, ethylene/butene-1, ethylene/hexene-1, ethylene/propylene/butene-1, ethylene/propylene/5-ethylidene-2-norbornene and the like, propylene/butene-1, and the like, but are not limited thereto.

The polymerization method is not limited, and both liquid phase polymerization method and gas phase polymerization method can be used. Examples of solvent used for liquid phase polymerization include aliphatic hydrocarbons such as butane, pentane, heptane, octane and the like; aromatic hydrocarbons such as benzene, toluene and the like; and hydrocarbon halides such as methylene chloride and the like. It is also possible to use at least a portion of the olefin to be polymerized as a solvent. The polymerization can be conducted in a batch-wise, semibatch-wise or continuous manner, and polymerization may be conducted in two or more stages which differ in reaction conditions. The polymerization temperature can be from about 50° C. to about 200° C., or from 0° C. to about 100° C. The polymerization pressure can be from atmospheric pressure to about 100 kg/cm², or from atmospheric pressure to about 50 kg/cm². Appropriate polymerization time can be determined by means known to those skilled in the art according to the desired olefin polymer and reaction apparatus, and is typically within the range from about 1 minute to about 20 hours. In the present invention, a chain transfer agent such as hydrogen may be added to adjust the molecular weight of olefin polymer to be obtained in polymerization.

Organoaluminum compound can be added during polymerization to remove impurities, such as water. Organoaluminum compound useful herein can comprise a variety of organoaluminum compounds, including at least one currently known organoaluminum compound, for example, organoaluminum compound $R^3_c\ AlY_{3-c}$ (wherein $R^3$ represents a hydrocarbon group having 1 to about 20 carbon atoms; Y represents hydrogen atom and/or halogen atoms; and "c" represents an integer of 0 to 3). Specific examples of $R^3$ include methyl group, ethyl group, n-propyl group, n-butyl group, isobutyl group, n-hexyl group and the like. Specific examples of the halogen atom for Y include fluorine atom, chlorine atom, bromine atom and iodine atom. Specific examples of the organoaluminum compound $R^3_c\ AlY_{3-c}$ include trialkylaluminums such as trimethylaluminum, triethylaluminum, tri-n-propylaluminum, trisobutylaluminum, tri-n-hexylaluminum and the like; dialkylaluminum chloride such as dimethylaluminum chloride, diethylaluminum chloride, di-n-propylaluminum chloride, diisobutylaluminum chloride, di-n-hexylaluminum chloride and the like; alkylaluminum dichlorides such as methylaluminumdichloride, ethylaluminum dichloride, n-propylaluminum dichloride, isobutylaluminum dichloride, n-hexylaluminum dichloride and the like; and dialkylaluminum hydrides such as dimethylaluminum hydride, diethylaluminum hydride, di-n-propylaluminum hydride, diisobutylaluminum hydride, di-n-hexylaluminum hydride and the like.

EXAMPLES

Preparation of Ionic Compound

In a drybox, 2.00 g (0.0108 mol) of $C_6F_5OH$ (pentafluorophenol) was mixed with 0.657 g (0.00540 mol) of $NMe_2Ph$ (N,N-dimethylaniline) in a vial. After a few hours the slurry mixture solidified to form a crystalline solid. The resulting solid was analyzed by $^1H$ NMR and it showed that the solid had a composition of two moles of pentafluorophenol per mole of N,N-dimethylaniline (structure shown below).

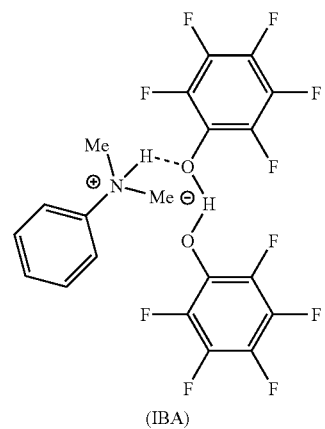

(IBA)

Conductivity Test of IBA

Table 1 lists the conductivity of several samples.

TABLE 1

| | Conductivity Results Obtained in $CH_3CN$ Solution at Room Temperature | | | |
|---|---|---|---|---|
| Sample No. | 1 | 2 | 3 | 4 |
| Sample | $C_6F_5OH$ only | $PhNMe_2$ only | $C_6F_5OH$ + $PhNMe_{2\ (1:1)}$ | $C_6F_5OH$ + 0.5 $PhNMe_{2\ (2:1)}$ |
| Concentration (mmol/g) of phenol | 1.09 | 1.09[1] | 1.09 | 1.09 |
| Conductivity (uS/cm) | 314 | 92.9 | 2,217 | 2,049 |

[1]concentration of amine (since no phenol included)

The increases in conductivity of samples 3 and 4 (over that of samples 1 and 2) confirms the formation of ionic species. In sample 3, the excess amine adds to the conductivity, but not substantially. The excess amount of amine in the 1:1 charged sample (sample 3) does not form significantly more ionic compound. Therefore, a 1:1 charge of the two components only forms 0.5 equivalent of the ionic species with 0.5 equivalent of excess amine.

In these examples, IBA was prepared according to the method described above. Also the amount of IBA:Al ratio was half of C6F5OH:Al because there are two moles of C6F5OH in IBA. One of the examples used IBA only (C6F5OH:Amine=2.1) (see entry 4); and some of the examples used a mixture of IBA and Amine (C6F5OH:Amine=2:2) (see entries 2 and 3). Conductivity data indicates that the species with C6F5OH:Amine=2:2 was a mixture of IBA and amine, not another new species. Also, when the reaction was done in isohexane, IBA was the solid precipitate and the excess amine was washed away during isolation.

Comparative Example (Entry 1 in Table 2)

Silica was first calcined at the temperature indicated in Table 2 for 4 hours (h) and cooled to room temperature. Aluminoxane in toluene was added to the slurry of silica and toluene slowly at room temperature; the resulting slurry was heated and then stirred for 3 h at 100° C. The solid support was then filtered, washed three times with isohexane and dried under vacuum. IBA or IBA and amine N,N-dimethylaniline mixture was dissolved in toluene and added to the support/toluene slurry. The reaction was shaken for 2~4 h to form the supported activator. Metallocene and toluene were added to the solid support and the reaction was shaken overnight. The catalyst was filtered, washed three times with toluene and three times with isohexane, and then dried under vacuum. (see data in Table 2, Attachment 1)

Examples of Invention (Entries 2 through 4 in Table 2)

Silica was first calcined at the temperature indicated in Table 2 for 4 h and cooled to room temperature. An amount of $C_6F_5OH$ as shown in Table 2 was dissolved in toluene and added to aluminoxane in toluene at room temperature. The reaction was stirred for a few hours at room temperature or heated and stirred for 1 h at 85° C. The modified aluminoxane in toluene was added to the slurry of silica and toluene slowly at room temperature; the resulting slurry was heated and then stirred for 3 h at 100° C. The solid support was then filtered, washed three times with isohexane and dried under vacuum. IBA or IBA and amine N,N-dimethylaniline mixture was dissolved in toluene and added to the support/toluene slurry. The reaction was shaken for 2-4 h to form the supported activator. Metallocene and toluene were added to the supported activator and the reaction was shaken overnight. The catalyst was filtered, washed three times with toluene and three times with isohexane, and then dried under vacuum. (see data in Table 2, Attachment 1)

Polymerization Test

A 4 L reactor was dried by heating at 100° C. for 15 minutes minimum under low pressure nitrogen flow. After cooling to ambient, the reactor was pressurized with isobutane and vented three times to remove nitrogen. Isobutane (1800 ml) was charged into the reactor while adding 40 ml of dried 1-hexene and 2 ml of 10% TIBA scavenger, such as organoaluminum compound as described herein. The reactor agitator was set at 800 rpm. After flushing the charging line with 200 ml of isobutane, the reactor was charged with ethylene up to 320 psi for supported M5 while at the same time bringing the temperature of the reactor up to 80° C. Then, 30-100 mg of solid catalyst was slurried in 2 ml of hexane in the glovebox and then injected into the reactor. The reaction pressure was maintained at 320 psi and the polymerization was carried out for 1 hour at 80° C. The reaction was stopped by venting off the ethylene and isobutane. The polymer was isolated, dried, and weighed. The polymerization productivity and activity of each catalyst was calculated and is listed in Table 2, Attachment 1.

The supported M5 catalysts from pretreated EAO/silica gave much better productivity and activity than that from the non-treated EAO/silica. Even when the Zr loading was very low, as in Entry 4, the catalyst still showed high productivity and great activity. For supported M1 catalyst (data not shown), the pretreated sample had similar activity as the non-pretreated sample.

While the present invention has been described in terms of one or more preferred embodiments, it is to be understood that other modifications may be made without departing from the scope of the invention, which is set forth in the claims below.

Attachment 1

TABLE 2

| Entry # | Silica/ Calcination Temperature | RAO | IBA (mol % Al) | Amine (mol % Al) | Mtn | Al wt % | Zr wt % | Productivity (g/g cat/h) | Activity (Kg/g Zr/h) |
|---|---|---|---|---|---|---|---|---|---|
| 1 | G952/600° C. | EAO | 20 | 20 | M5 | 8.09 | 0.418 | 3,300 | 789 |
| 2 | ES70/600° C. | 5% $C_6F_5OH$-EAO | 20 | 20 | M5 | 6.89 | 0.55 | 8,000 | 1,450 |
| 3 | ES70/600° C. | 10% $C_6F_5OH$-EAO | 20 | 20 | M5 | 7.32 | 0.57 | 6,200 | 1,080 |
| 4 | ES70/600° C. | 10% $C_6F_5OH$-EAO | 20 | 0 | M5 | 7.11 | 0.20 | 5,600 | 2,820 |

What is claimed is:

1. A composition derived from at least:
   a) a carrier;
   b) a treated organoaluminoxy compound, which is derived from at least an organoaluminoxy compound and a component having at least one electron withdrawing group and at least one active proton; and
   c) an ionic compound having at least one active proton.

2. The composition of claim 1, wherein the carrier comprises an inorganic oxide.

3. The composition of claim 2, wherein the inorganic oxide has a micro pore volume of not less than about 0.3 ml/g and an average particle diameter of about 10 micrometers to about 500 micrometers.

4. The composition of claim 2 wherein the inorganic oxide comprises silica, alumina, silica-alumina, magnesia, titania, zirconia, or clays.

5. The composition of claim 1 wherein the organoaluminoxy compound comprises an alkylaluminoxane.

6. The composition of claim 5 wherein the alkylaluminoxane comprises methylaluminoxane, ethylaluminoxane, n-propylaluminoxane, iso-propylaluminoxane, n-butylaluminoxane, iso-butylaluminoxane, sec-butylaluminoxane, n-pentylaluminoxane, n-hexylaluminoxane, n-heptylaluminoxane, or n-octylaluminoxane.

7. The composition of claim 1 wherein the component having at least one electron withdrawing group and at least one active proton comprises pentafluorophenol, 2,3,5,6-tetrafluorophenol, 2,4,6-trifluorophenol, 2,3-difluorophenol, 2,4-difluorophenol, 2,5-difluorophenol, 2,6-difluorophenol, 3,4-difluorophenol, 3,5-difluorophenol, 2-fluorophenol, 3-fluorophenol, 4-fluorophenol, 2-trifluoromethylphenol, 3-trifluoromethylphenol, 4-trifluoromethylphenol, pentafluorobenzyl alcohol, pentafluorothiophenol, 2,2,2-trifluoroethyl alcohol, 1H, 1H-pentafluoro-propanol, 1,1,1,3,3,3-hexafluoro-2-propyl alcohol, pentachlorophenol, pentabromophenol, 2-chloro-4-fluorophenol, 2-bromo-4-fluorophenol, 2-bromo-4,5-difluorophenol, tetrafluorocatechol, or tetrafluorohydroquinone.

8. The composition of claim 1, wherein the ionic compound having at least one active proton is derived from at least a Lewis base and a portion of the component having at least one electron withdrawing group and at least one active proton.

9. The composition of claim 8 wherein the Lewis base comprises at least one $NR^2_3$, wherein each $R^2$ is a hydrocarbyl group having up to about 20 carbon atoms and each $R^2$ can be the same as, or different from, any other $R^2$.

10. The composition of claim 8, wherein the Lewis base comprises $NMe_2Ph$, $NMe_2(CH_2Ph)$, $NEt_2Ph$, $NEt_2(CH_2Ph)$, $NMe(C_nH_{2n+1})(C_mH_{2m+1})$, $NMe_2(C_nH_{2n+1})$, $NEt(C_nH_{2n+1})(C_mH_{2m+1})$, or $NEt_2(C_nH_{2n+1})$ and wherein n and m are independently an integer from 3 to 20.

11. The composition of claim 1, wherein the composition is suitable for activating an alkylated transition metal component by protonatation.

12. A composition derived from at least:
a) a carrier;
b) a treated organoaluminoxy compound, which is derived from at least an organoaluminoxy compound and a component having at least one electron withdrawing group and at least one active proton; and
c) N,N-dimethylaniline and pentafluorophenol in amounts such that there are at least 2 moles of pentafluorophenol per mole of the N,N-dimethylaniline.

13. A catalyst for olefin polymerization, wherein the catalyst comprises the composition of claim 1 and an alkylated transition metal component.

14. A method of preparing a composition comprising combining at least:
a) a carrier;
b) a treated organoaluminoxy compound, which is prepared by combining at least an organoaluminoxy compound and a component having at least one electron withdrawing group and at least one active proton; and
c) an ionic compound having at least one active proton.

15. The method of claim 14 wherein the carrier comprises an inorganic oxide.

16. The method of, claim 14 wherein the carrier, the treated organoaluminoxy compound, and the ionic compound having at least one active proton are combined in amounts sufficient and under conditions sufficient such that the composition is suitable for activating alkylated transition metal component by protonation.

17. A method of preparing a catalyst for olefin polymerization, comprising combining an alkylated transition metal component with composition derived from at least a carrier; a treated organoaluminoxy compound, which is derived from at least an organoaluminoxy compound and a component having at least one electron withdrawing group and at least one active proton; and an ionic compound having at least one active proton.

18. A method of polymerizing monomer comprising combining the catalyst of claim 13 and a monomer.

19. A method of polymerizing monomer comprising combining the composition of claim 1, an alkylated transition metal component, and a monomer.

20. A composition derived from at least:
a) a carrier;
b) a treated organoaluminoxy compound, which is derived from at least an organoaluminoxy compound and a component having at least one electron withdrawing group and at least one active proton; and
c) an ionic compound having at least one active proton, which is derived from N,N-dimethylaniline and pentafluorophenol.

21. A method of preparing a composition comprising combining at least:
a) a carrier;
b) a treated organoaluminoxy compound, which is derived from at least an organoaluminoxy compound and a component having at least one electron withdrawing group and at least one active proton; and
c) an ionic compound having at least one active proton, which is derived from N,N-dimethylaniline and pentafluorophenol.

* * * * *